United States Patent
Miyazaki et al.

(10) Patent No.: US 7,206,939 B2
(45) Date of Patent: Apr. 17, 2007

(54) FILE STORAGE SYSTEM AND A NAS SERVER

(75) Inventors: Kunihiko Miyazaki, Yokohama (JP); Shinji Itoh, Yokohama (JP); Narihiro Omoto, Toda (JP); Yoshiharu Bessho, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 768 days.

(21) Appl. No.: 10/157,042

(22) Filed: May 30, 2002

(65) Prior Publication Data

US 2003/0187885 A1 Oct. 2, 2003

Related U.S. Application Data

(63) Continuation-in-part of application No. 09/816,777, filed on Mar. 22, 2001, now Pat. No. 7,134,021, which is a continuation-in-part of application No. 09/693,713, filed on Oct. 19, 2000.

(30) Foreign Application Priority Data

Mar. 26, 2002 (JP) ............................ 2002-085836

(51) Int. Cl.
- G06F 11/30 (2006.01)
- G06F 12/14 (2006.01)
- H04L 9/32 (2006.01)
- H04L 9/00 (2006.01)

(52) U.S. Cl. .............. 713/193; 713/176; 713/178; 713/181

(58) Field of Classification Search ............. 713/178
See application file for complete search history.

(56) References Cited

U.S. PATENT DOCUMENTS

| 5,136,646 | A |  | 8/1992 | Haber et al. |
| 5,465,299 | A | * | 11/1995 | Matsumoto et al. ....... 713/176 |
| 5,619,571 | A | * | 4/1997 | Sandstrom et al. ....... 380/200 |
| 5,748,738 | A | * | 5/1998 | Bisbee et al. ............. 713/178 |
| 5,781,909 | A |  | 7/1998 | Logan et al. |
| 5,956,404 | A |  | 9/1999 | Schneier et al. |
| 2002/0013832 | A1 |  | 1/2002 | Hubbard |
| 2002/0023221 | A1 | * | 2/2002 | Miyazaki et al. .......... 713/178 |

FOREIGN PATENT DOCUMENTS

EP  0 767 435 A1  4/1997

OTHER PUBLICATIONS

U.S. Appl. No. 09/697,666, filed Oct. 20, 2000, Susaki et al.
U.S. Appl. No. 09/693,713, filed Oct. 19, 2000, Miyazaki et al.

* cited by examiner

*Primary Examiner*—Kambiz Zand
*Assistant Examiner*—Benjamin E. Lanier
(74) *Attorney, Agent, or Firm*—McDermott Will & Emery LLP

(57) ABSTRACT

A reliably safe storage system is provided which makes provable the status of a file stored in a storage server at a time specified by a user and creates evidence information that will be effective in future. In response to a file status fixing request from the user over a network, a storage server generates file fixing guarantee data, including data publicized by a publication server, and saves the generated data with the file associated with the generated data.

10 Claims, 12 Drawing Sheets

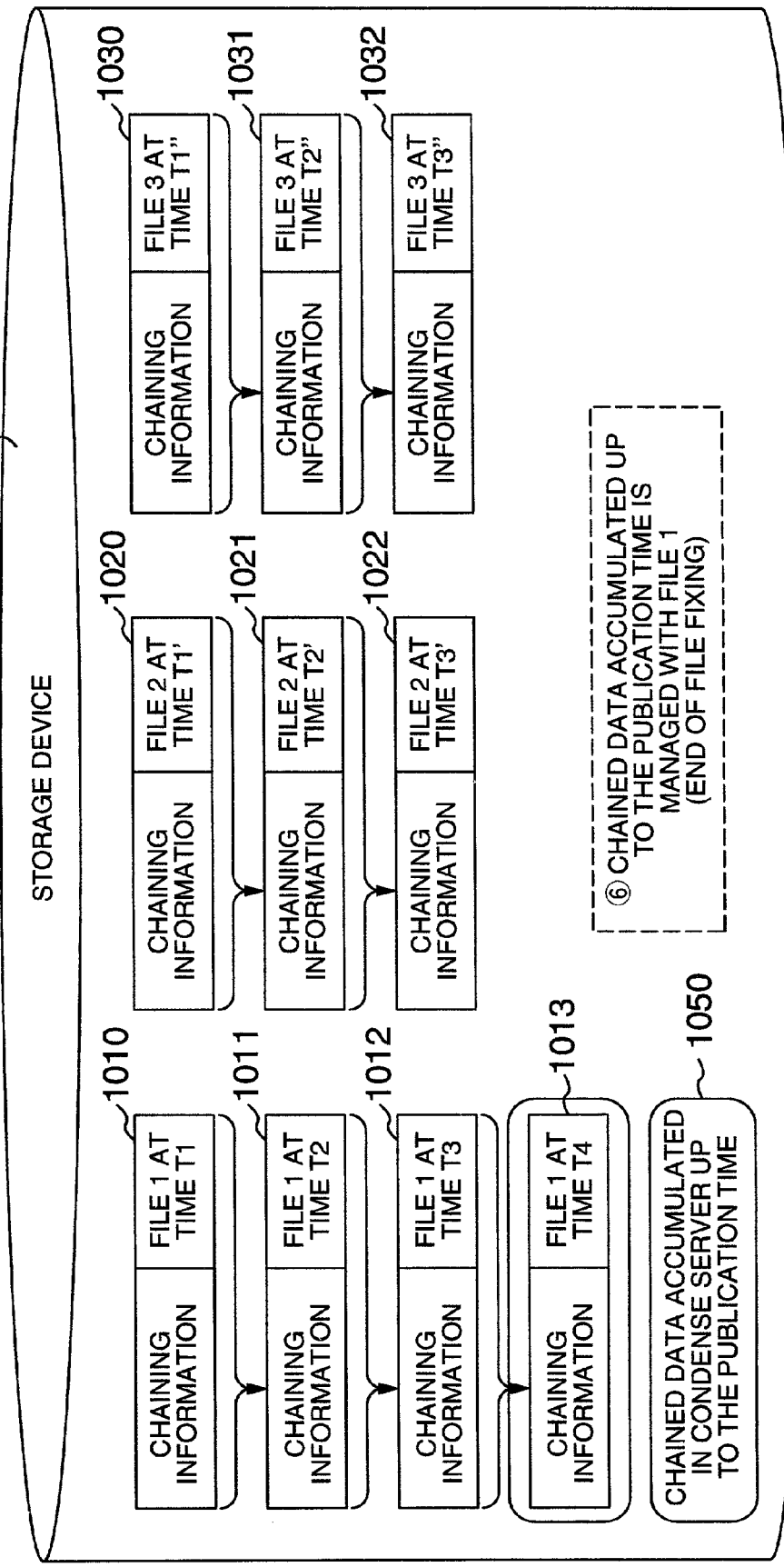

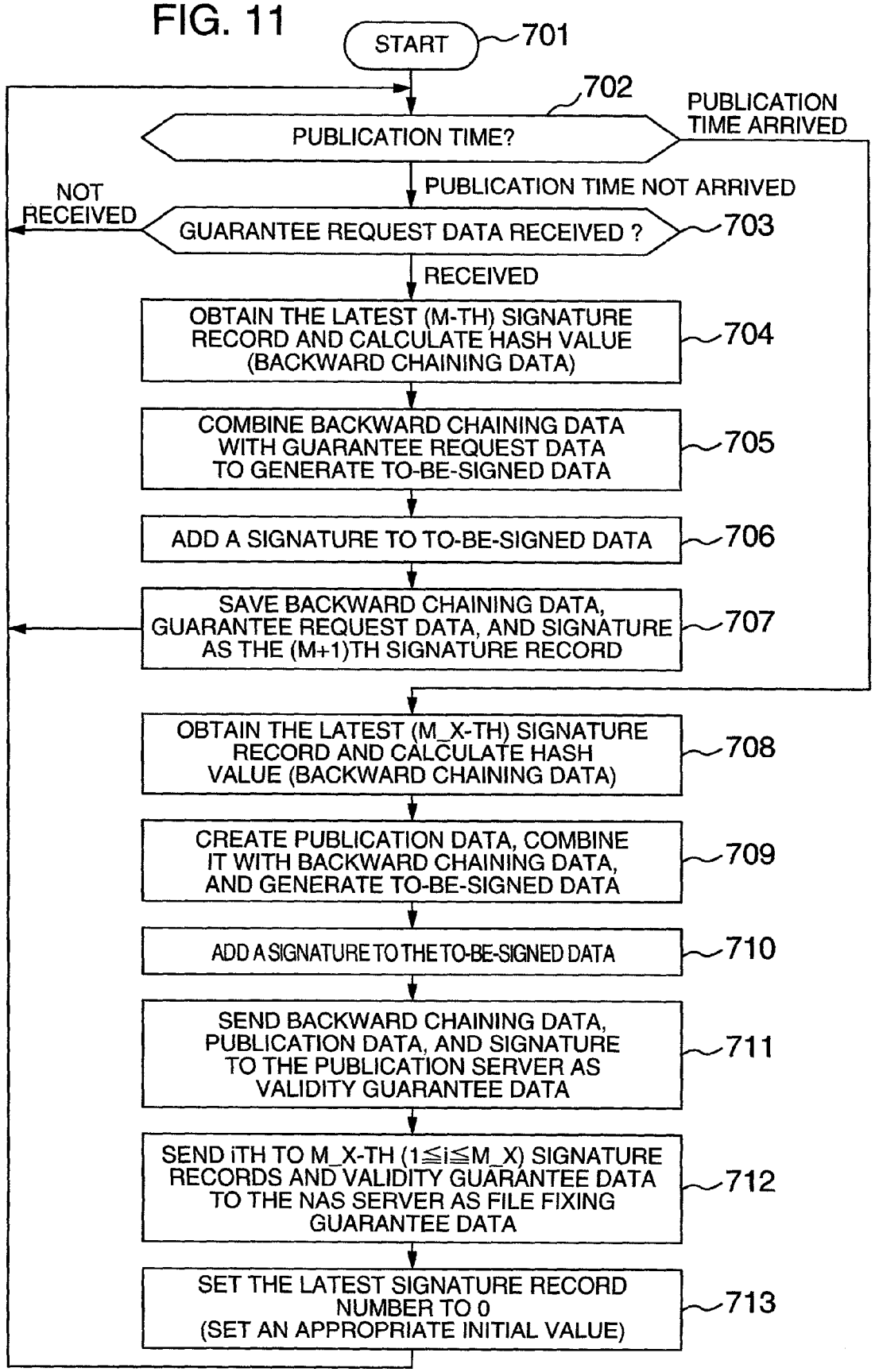

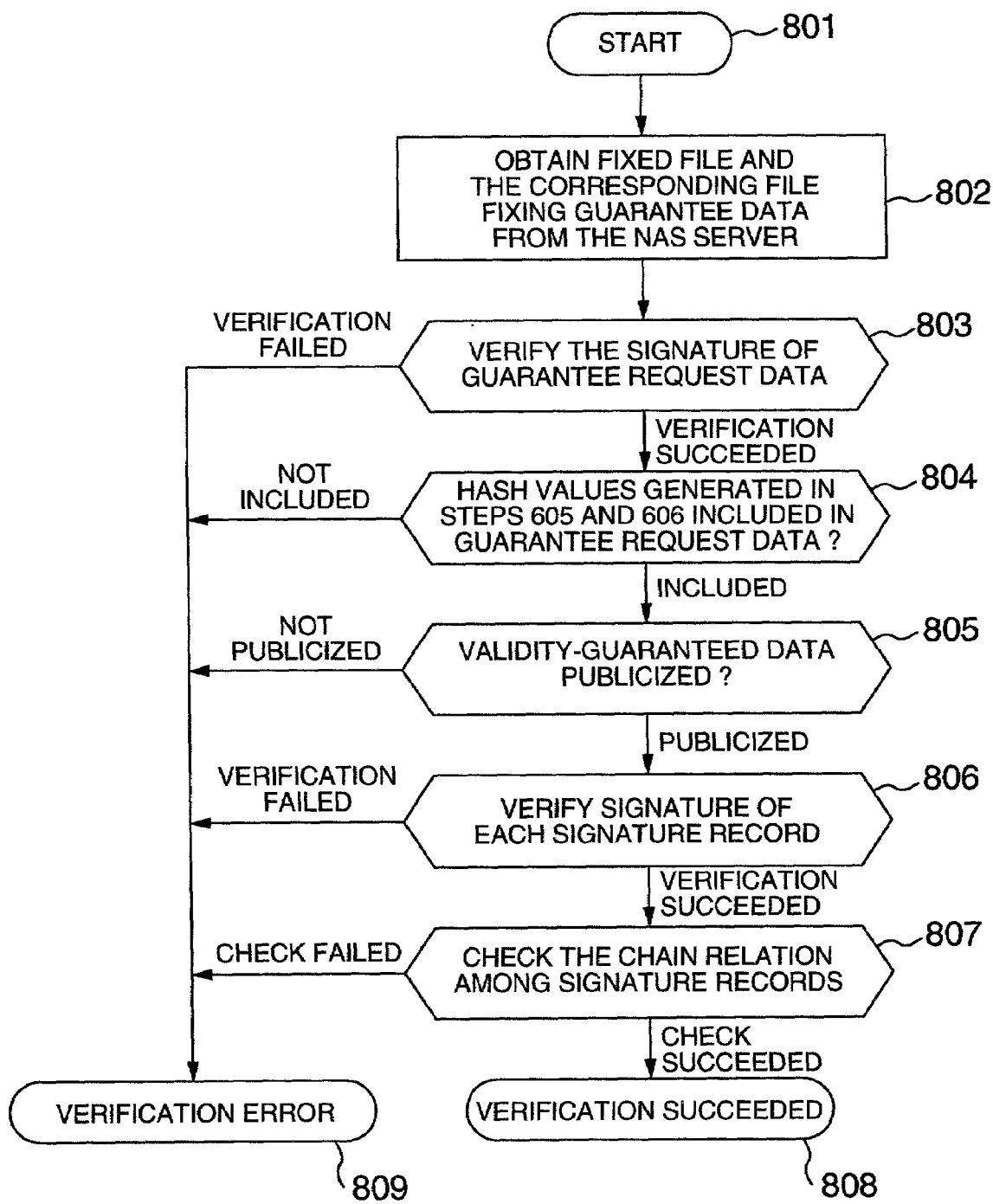

FILE STORAGE SYSTEM AND A NAS SERVER

CROSS-REFERENCES TO RELATED APPLICATIONS

This application is a continuation in part of U.S. application Ser. No. 09/816,777 entitled "Method and System for Recovering the Validity of Cryptographically Signed Digital Data" filed Mar. 22, 2001, which is a continuation in part of U.S. application Ser. No. 09/693,713 filed Oct. 19, 2000 now U.S. Pat. No. 7,134,021 entitled "Digital Signing Method;" and this application claims priority under 35 U.S.C. § 120 from both of those earlier filed applications.

This application also relates to U.S. application Ser. No. 09/697,666 filed Oct. 10, 2000 entitled "Method and System for Guaranteeing Validity of Information" and assigned to the present assignee.

The disclosures of the 09/697,666 and 09/693,713 applications are incorporated herein by reference.

BACKGROUND OF THE INVENTION

The present invention relates to digital data and file storage technologies, and more particularly to file storage technologies, such as NAS (Network Attached Storage), suitable for storing files safely over a network.

One example of storing files over a network is NAS. NAS, which is a storage (an external storage device) directly connected to a network such as a LAN (Local Area Network), comprises storage management software, a NAS operating system, a graphical user interface, and various types of hardware (processor, memory, storage interface, network interface, and so on).

The technologies implemented by those components allow a NAS unit (NAS server) to function on a network as an independent file server through which files are shared and, at the same time, allow a client to do operation as if access was made to a conventional file server.

However, a conventional NAS server does not have a function to prove the existence time and the non-alterability of stored data for a long time. Therefore, when it is desired to prove the data existence time and the non-alterability of data for a long time, the NAS user must take some guarantee measures in advance before storing data in NAS.

Taking such guarantee measures requires an additional cost because a special device is required. This increases a load on general NAS users.

SUMMARY OF THE INVENTION

The problem to be solved is that, in the prior art, the existence time and the non-alterability of digital data stored in a storage server cannot be proved for a long time without placing a load on the user.

It is an object of the present invention to provide file storage technologies that solve the above problems and that increase the reliability and convenience of a storage system, such as NAS, that stores digital data over a network.

To achieve the above object, in accordance with one aspect of the present invention, there is provided a system that may prove the existence time and the non-alterability of data stored in the NAS server for a long time to guarantee the validity of data. For example, in response to a request from a NAS user, the NAS server generates guarantee data for a file to be guaranteed, that is, evidence information proving that the data is not altered even after a long time since the guarantee request was issued, and saves the generated guarantee data with the file to be guaranteed. Because the NAS server where files are saved generates guarantee data, the NAS user's load is reduced. At the same time, it becomes easy for the NAS server 103 to manage the files to be guaranteed and their guarantee data because they can be managed integrally.

Guarantee data generated by the NAS server includes data publicized on newspapers and so on by the publication server. This makes it extremely difficult to alter the guarantee data. This difficulty in alteration is achieved by the fact that guarantee data is associated or correlated with the real world, for example, by the information publicized on newspapers. Therefore, even if an encryptosystem break occurs after a long time has elapsed since a guarantee request was issued, the reliability of the guarantee data is still maintained. In this case, an encryptosystem break refers to a condition in which the encryption technology is endangered for some reasons; for example, the secret information used by the encryption technology is leaked, the cryptanalysis technology has advanced, and so on.

In another aspect of the present invention, when the NAS server uses the publication server to generate guarantee data, a condense server (an integrate server) is provided between them. The condense server collects the requests from a plurality of NAS servers, reduces the data size, and sends the collected requests to the publication server. This method makes it possible for the publication server to reduce the amount of processing and for the NAS server to eliminate the need to ask the publication server to directly publicize the information, thus lowering the cost. In addition, the condense server that collects requests from the plurality of NAS servers may prove the relative chronological order of processes performed by the plurality of NAS servers.

Other objects, features and advantages of the invention will become apparent from the following description of the embodiments of the invention taken in conjunction with the accompanying drawings.

BRIEF DESCRIPTION OF THE DRAWINGS

FIG. 1A in FIG. 1 is a diagram showing the details of a storage device 204.

FIG. 11 is a sequence diagram showing an example of the second operation of file status fixing processing of the file storage system in FIG. 1.

FIG. 12 is a sequence diagram showing an example of file status fixing verification processing operation of the file storage system in FIG. 1.

DETAILED DESCRIPTION OF THE EMBODIMENTS

An embodiment of the present invention will be described in detail with reference to the drawings.

A file storage system shown in FIGS. 1, 1A, 4 and 5 comprises a user's PC 102 (PC: Personal Computer), a NAS server 103 which stores the files of the users of the NAS server 103, a condense server 104 which condenses data used to guarantee the validity of files stored in the NAS server 103 and performs the guarantee procedure, and a publication server 105 which publicizes validity-guaranteed data generated by the condense server 104 on newspapers to guarantee the validity of data, all being interconnected via the Internet 101.

The file storage system in this embodiment, with the configuration described above, guarantees files by proving, for a long time, the existence time and non-alterability of data stored in the NAS server 103. Essentially, in response to a request from the user's PC 102, the NAS server 103 generates guarantee data, which is proof information proving that a file to be guaranteed is not altered even if a long time has elapsed from the time the guarantee request was received, and saves this guarantee data with the file to be guaranteed.

Because the NAS server 103 that stores files generates guarantee data as described above, the NAS user's load is reduced. In addition, because a file to be guaranteed is associated with guarantee data, the NAS server 103 is able to manage them more easily.

Guarantee data generated by the NAS server 103 includes data publicized on newspapers by the publication server 105. This makes it extremely difficult to alter guarantee data. Because this difficulty in alteration is achieved by the fact that guarantee data is associated with the real world, the reliability of guarantee data is still maintained even if an encryptosystem break occurs after a long time has elapsed from the time the guarantee request was made.

In addition, when the NAS server 103 uses the publication server 105 to generate guarantee data, the condense server 104 is provided between those two servers. This condense server 104 collects requests from many NAS servers 103 to reduce the data size before data is sent to the publication server 105. This method makes it possible for the publication server 105 to reduce the amount of processing and for the NAS servers 103 to eliminate the need to ask the publication server 105 to directly publicize the information, thus lowering the cost. In addition, the condense server 104 that collects requests from a plurality of NAS server 103 may prove the relative chronological order of processes performed by the plurality of NAS server 103.

Figure 1:
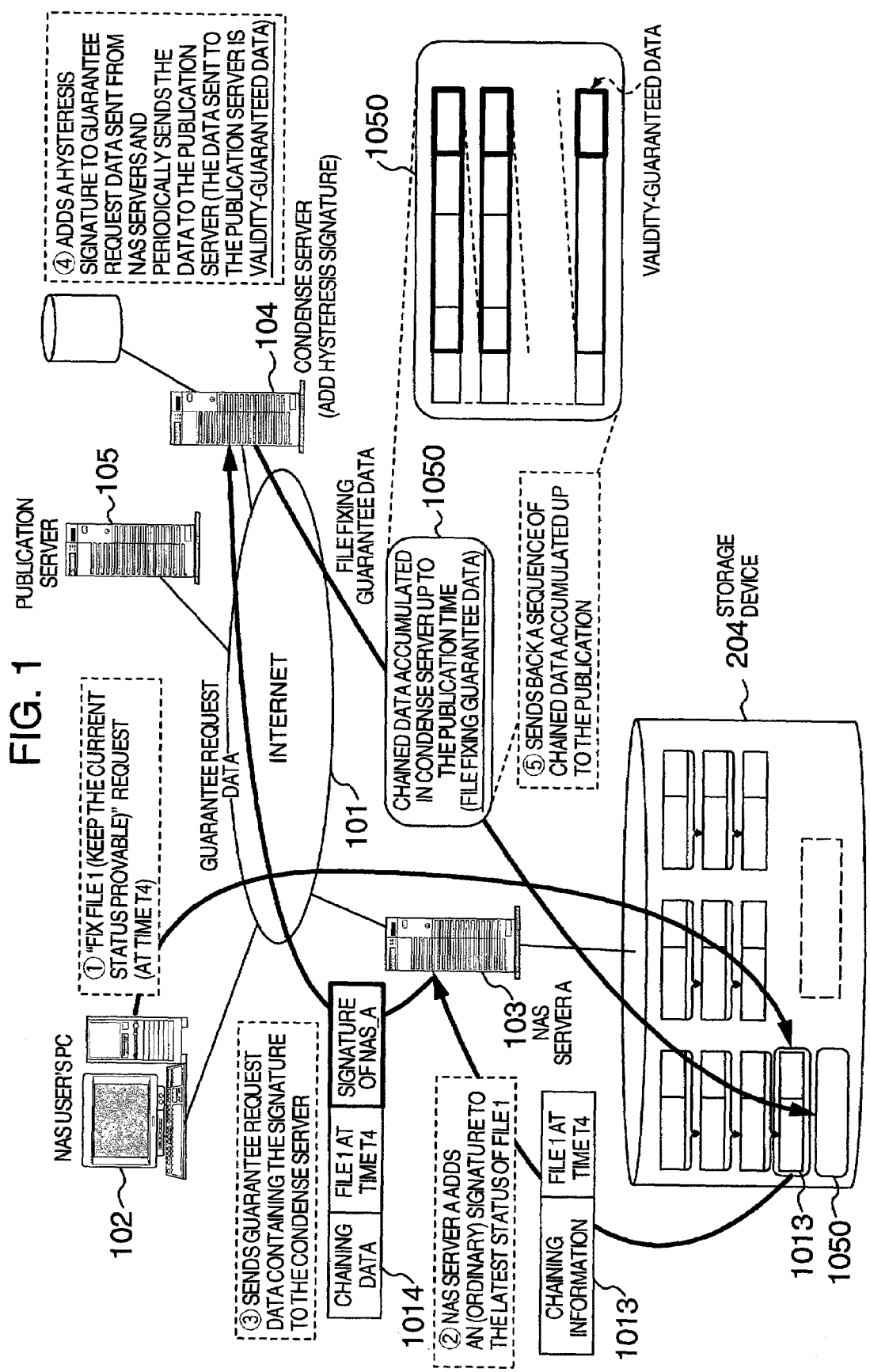
FIG. 1 is a block diagram showing an example of the configuration of a digital data storage system according to the present invention.

The components of such a file storage system will be described in detail below. Each of the user's PC 102, NAS server 103, condense server 104, and publication server 105, all shown in FIG. 1, is a computer comprising a CPU (Central Processing Unit), a main memory, a display, an input device, and an external storage. The programs and data are installed from a recording medium, such as a CD-ROM, onto the external storage of each component via an optical disk drive in advance. Then, each component reads the programs and data from the external storage into the main memory for execution by the CPU to execute the functions according to the present invention.

The configuration of the user's PC 102 in this embodiment is basically the same as that of a known PC (Personal Computer). The user's PC 102 creates files to be used by applications executed on the PC and saves the created files in the NAS server 103 connected via the network (Internet 101).

In addition, the user's PC 102 is configured to be able to read a file saved on the NAS server 103 in the past, change the contents of a file and then save it again, or add data to a file, as necessary.

The user's PC 102 in this embodiment is also able to request the NAS server 103 to keep the status of a file at a particular point in time, that is, the contents of the file as well as file management information such as a file name, creator, creation date and time, updater, update date and time, attribute, and access permission, so that the status may be proved in future (hereinafter, this is called "fix the file status").

The NAS server 103 in this embodiment saves files received from one or more user's PCs or reads saved files for transmission to the requesting user's PC in response to requests from one or more user's PCs connected via the Internet 101.

In addition, in response to a request from the user's PC 102, the NAS server 103 fixes the status of a saved file. When fixing the file status, the NAS server 103 in this embodiment uses the condense server 104, connected via the Internet 101, to guarantee validity.

Figure 6:
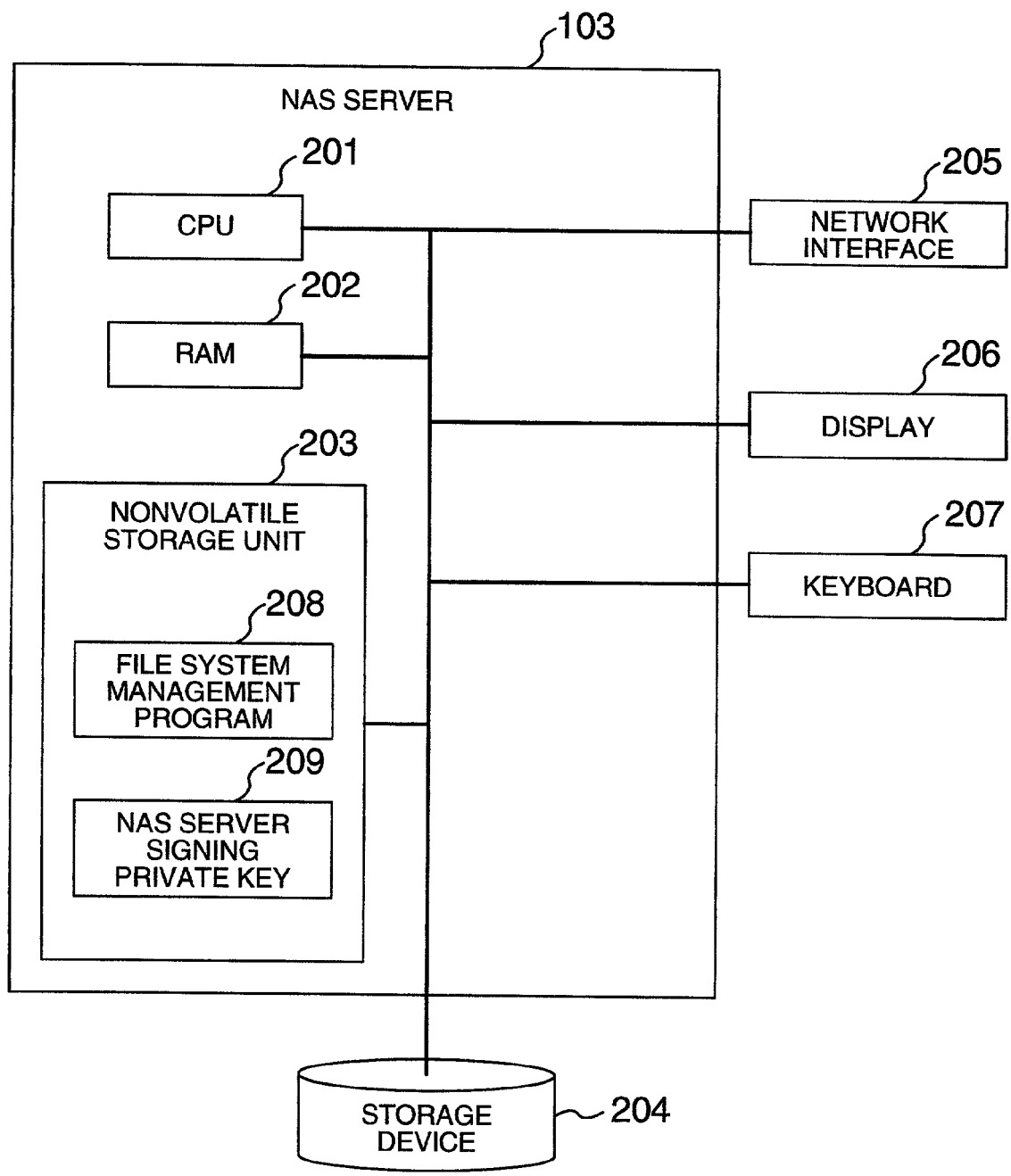
FIG. 6 is a block diagram showing an example of the configuration of the NAS server 103 in FIG. 1.

As shown in FIG. 6, the NAS server 103 comprises a CPU 201, a RAM 202, a nonvolatile storage unit 203, a storage unit 204, a network interface 205, a display 206, and a keyboard 207—all connected via signal lines.

The nonvolatile storage unit 203 contains a file system management program 208 and a NAS server signing private key 209.

The CPU 201 executes the file system management program 208 and other programs, which are stored in the nonvolatile storage unit 203, in the RAM 202 to implement their functions.

Figure 2:
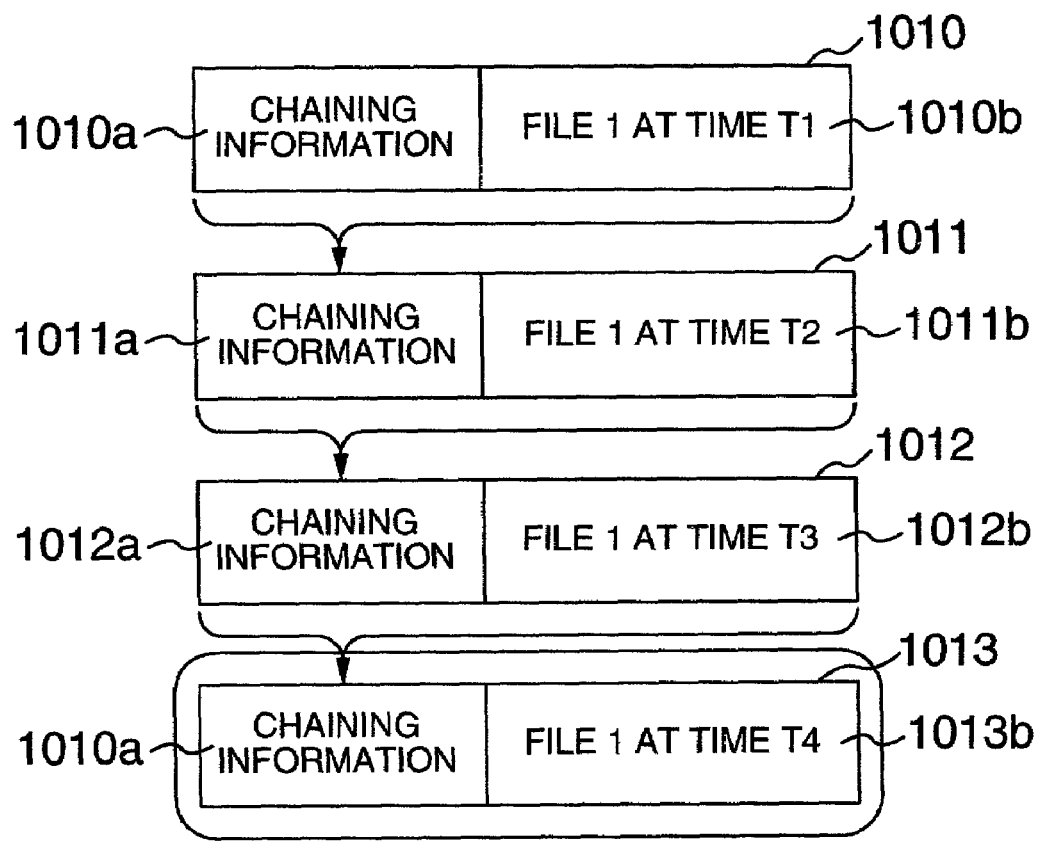
FIG. 2 is a diagram showing an example of the configuration of chained data generated by a NAS server 103 in FIG. 1.
Figure 4:
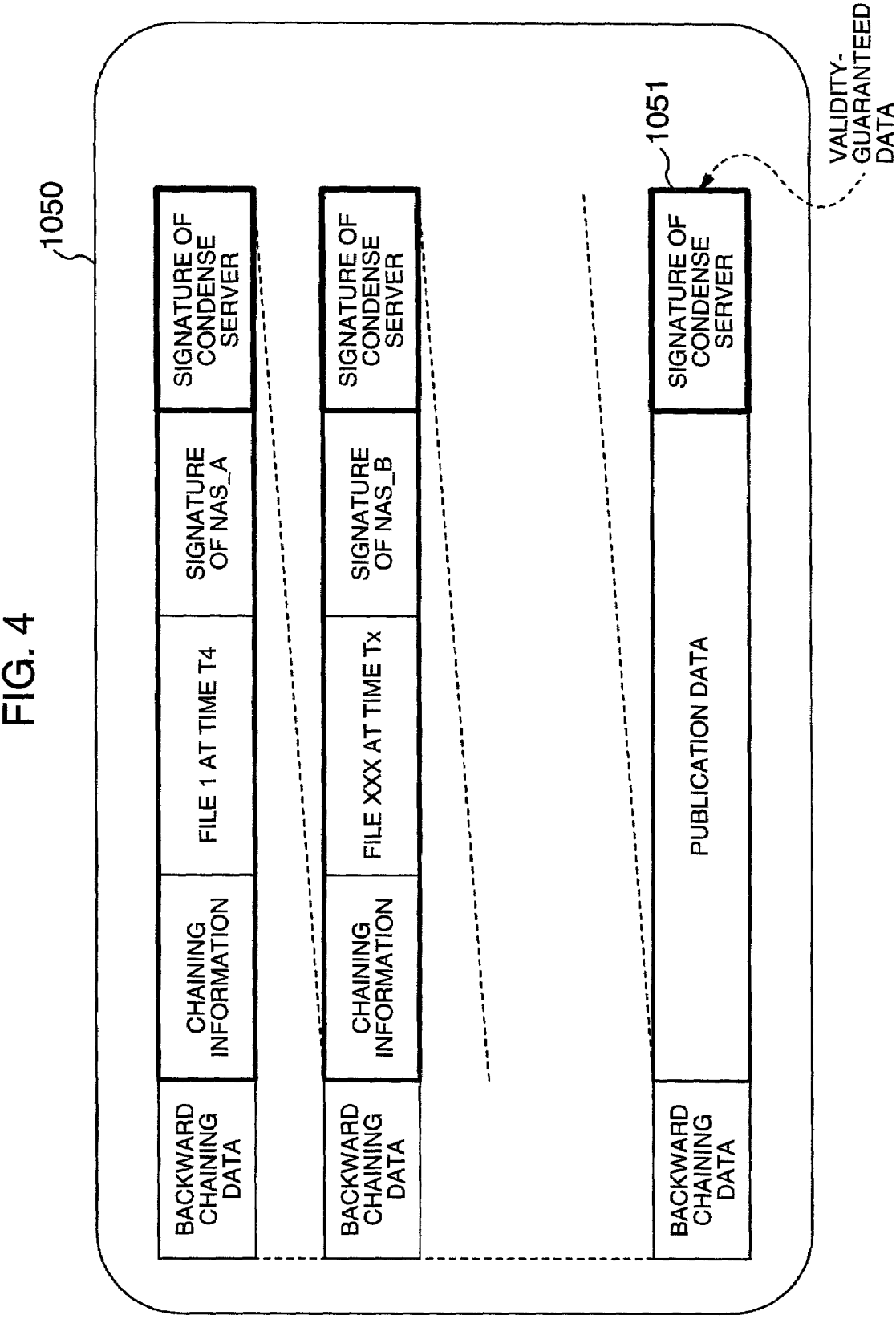
FIG. 4 is a diagram showing an example of the configuration of file fixing guarantee data 1050 stored in the NAS server 103 in FIG. 1.
Figure 5:
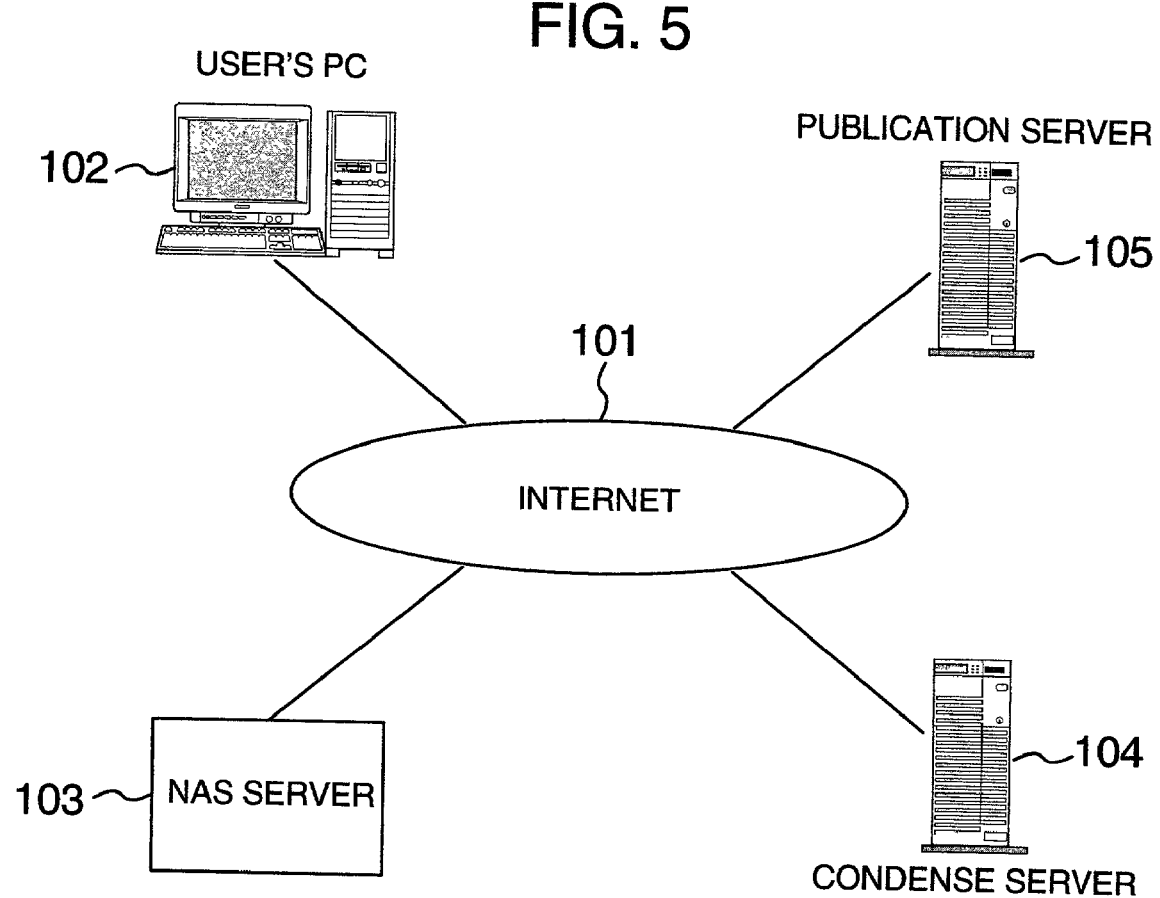
FIG. 5 is a block diagram showing an example of the general configuration of the digital data storage system in FIG. 1.

The storage device 204 stores the files received from the user's PC 102, chained data 1010–1013, 1020–1022, and 1030–1032 corresponding to the files, and file fixing guarantee data 1050 as shown in FIG. 1 and FIGS. 2 and 4.

The network interface 205 sends and receives information, as necessary, to and from other entities, such as the user's PC 102 and the condense server 104, on the network (Internet 101).

The configuration of the condense server 104 in the embodiment shown in FIG. 1 is basically the same as that of the NAS server 103 shown in FIG. 6. This condense server 104 periodically generates validity-guaranteed data based on guarantee request data 1014 received from one or more NAS servers 103 connected via a network, or the Internet 101 in this embodiment, and sends the generated validity-guaranteed data to the publication server 105.

In addition, the condense server 104 sends chained data back to the NAS servers 103 as the file fixing guarantee data 1050. This chained data guarantees the logical relation from the guarantee request data, received from the NAS server 103, to the validity-guaranteed data sent to the publication server 105.

To generate this chained data, the condense server 104 uses the hysteresis signature technology disclosed in JP-A-2001-331104 (European Patent Application No. 00119185.7 filed on Sep. 5, 2000 and JP-A-2001-331105 (corresponding to above-described U.S. Ser. Nos. 09/697,666 and 09/693,713, respectively). When creating a new signature, this hysteresis signature technology reflects signature history information, accumulated up to that moment, on a signature that is newly created. To do so, each time a signature is created, this technology adds created signature information to the signature history. As a result, all created signatures have a chain structure. Because not only signatures but also chains are verified during signature verification, it becomes difficult to alter data.

The publication server 105 in this embodiment places validity-guaranteed data 1051, which is received from one or more condense servers 104 connected via a network, that is, the Internet 101, in a state so that the general public can confirm it in future. For example, the validity-guaranteed data 1051 is publicized on newspapers, magazines, webs, and other mass media. Alternatively, the data 1051 is deposited with an organization trusted by a majority of users, or guaranteed by a central government, government agency, or notary office. In another way, the validity-guaranteed data 1051 is deposited with one or more users with no interest in it, so that a verifier can confirm that validity-guaranteed data 1051 certainly exists at a specific time without being altered. In the description below, those methods are called generally as "publication". The configuration of the publication server 105 may be designed according to the publication method.

The operation of the system according to the present invention, which is performed by the servers including the NAS server 103, condense server 104, and publication server 105, will be described with reference to FIG. 1.

The NAS server 103 stores "file 1", "file 2", and "file 3" in the storage device 204 as the chained data 1010–1013, 1020–1022, and 1030–1032 each time the files are created or updated with chaining information assigned to the files for chaining them at each time.

The chaining information in the chained data 1010–1013, 1020–1022, and 1030–1032 is obtained as follows. For example, the chaining information 1011a in the chained data 1011 ("file 1 at time T2") in FIG. 2 is obtained by applying the chained data 1010 stored immediately before, which is composed of the chaining information 1010a and "file 1 at time T1" 1010b, by a hash function. File generations are created in this way.

Figure 3:
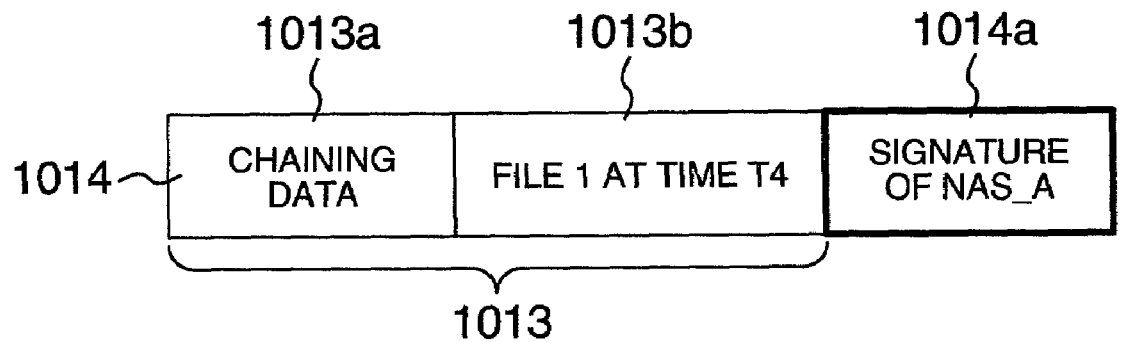
FIG. 3 is a diagram showing an example of the configuration of guarantee request data sent from a NAS server 103 to a condense server 104 in FIG. 1.

When the user's PC 102 issues ① (a "fix file 1 (keep the current status at time T4 in provable status)" request to the NAS server 103 with the files saved as described above, the NAS server 103 that has received the request reads the chained data 1013 from the storage device 204, uses the NAS server signing private key 209 shown in FIG. 6 to ② "add signature to the latest information of file 1", generates the guarantee request data 1014 detailed in FIG. 3, and sends the generated guarantee request data to the condense server 104 over the Internet 101.

As shown in FIG. 3, the guarantee request data 1014 is composed of the chained data 1013, which is composed of the chaining data 1013a and "file 1 at time T4" 1013b, and NAS_A signature 1014a.

In response to this guarantee request data 1014, the condense server 104 ④ "adds a hysteresis signature to the received guarantee request data and periodically sends data containing the latest hysteresis signature to the publication server 105." The data containing the hysteresis signature that the condense server 104 has sent to the publication server 105 in this way becomes validity-guaranteed data.

The chained data 1050 generated by the condense server 104 is obtained as follows. For example, as shown in FIG. 4, the signature generated via the private key of the condense server 104 is added to the guarantee request data 1014 sent from the NAS server 103 and, in addition, the hash value, which is calculated by applying the whole immediately-preceding chained data by the hash function is added to the guarantee request data 1014 as the backward chaining data to generate data containing the "hysteresis signature". The latest data is the validity-guaranteed data 1051.

After that, the condense server 104 ⑤ "sends back to the NAS server 103 a sequence of chained data accumulated up to the publication time (chained data 1050 accumulated in the condense server up to the publication time)".

Next, with reference to FIGS. 7 to 12, the processing operation of the file storage system in this embodiment will be described.

Figure 7:
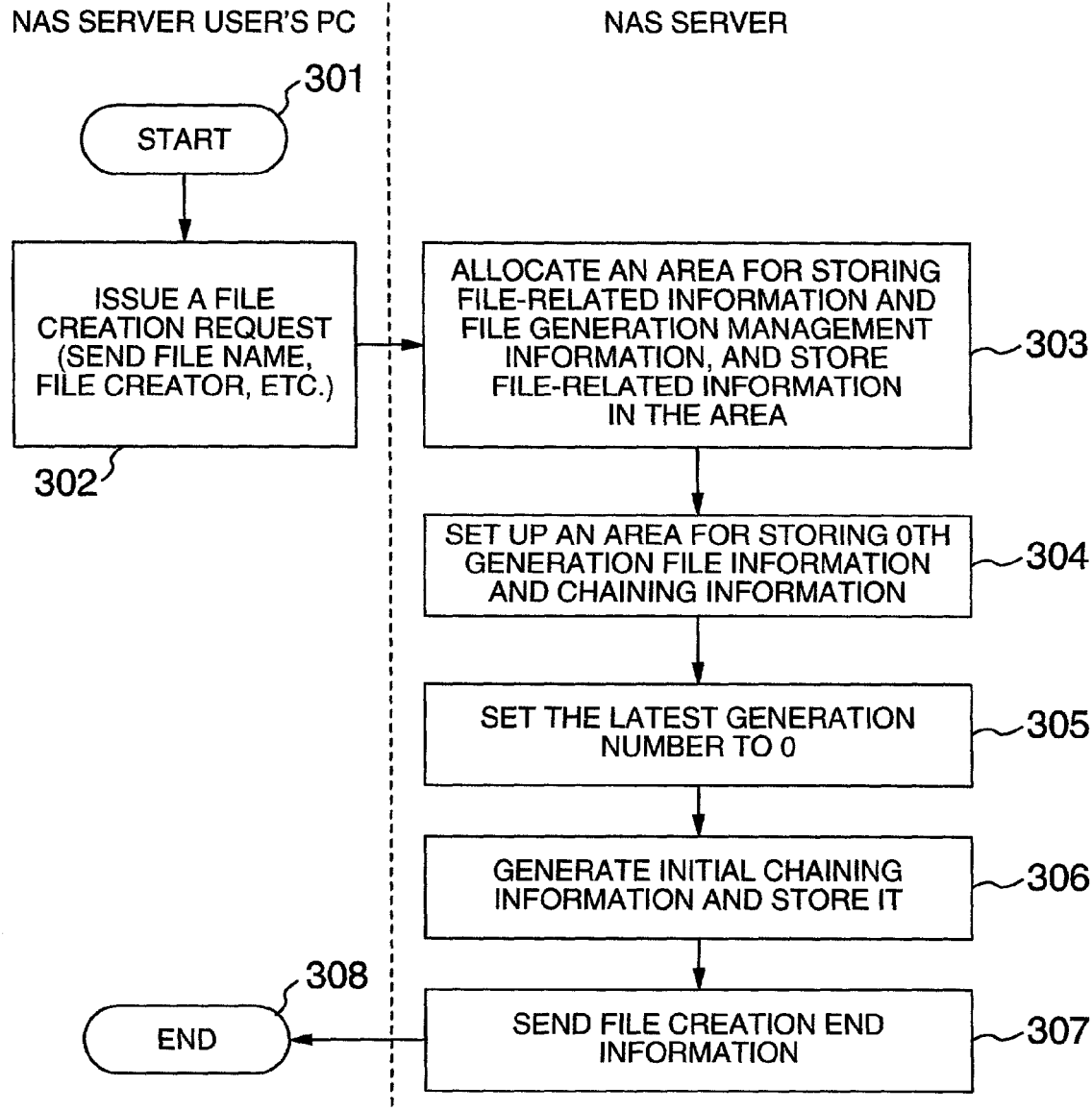
FIG. 7 is a sequence diagram showing an example of file creation processing operation of the file storage system in FIG. 1.

FIG. 7 shows an example of the flow of file creation processing performed by the user's PC 102 and the NAS server 103 in FIG. 1. In the description below, file creation refers to the allocation of an area in which a file is to be written and to the setting of file management information but does not include the saving of data.

Data is saved by file write processing that will be described later. Alternatively, a sequence of processing, from file creation to data saving, may be performed at a time by performing file creation processing and file write processing continuously.

The following describes file creation processing operation shown in FIG. 7.

First, the NAS user's PC 102 starts processing in step 301 and issues a file creation request to the NAS server 103 in step 302. That is, the information related to file management (file-related information) such as the file name and the file creator is sent to the NAS server 103.

Then, control is passed to the NAS server 103 which starts its processing. First, in step 303, an area is allocated for storing management information related to a file (in this example, called file-related information including data such as the file creator, creator, or access permission) and management information for managing file generations (called file generation management information in this example). The file-related information sent from the NAS user's PC 102 is stored in the allocated area.

Next, in step 304, an area is allocated for storing the file contents (called file information in this example) and information for building the structure of file generations (called chaining information in this example). Allocation information, such as information on the storage positions where information is to be stored, is stored in the generation number "0" column in the file generation management information.

In step 305, "0" is set in the latest generation number column in the file generation management information and, in step 306, the initial chaining data is generated and saved in the chaining information area allocated in step 304.

In step 307, the NAS server returns file creation end information. In response to this information, the NAS user's PC 102 ends processing in step 308.

Figure 8:
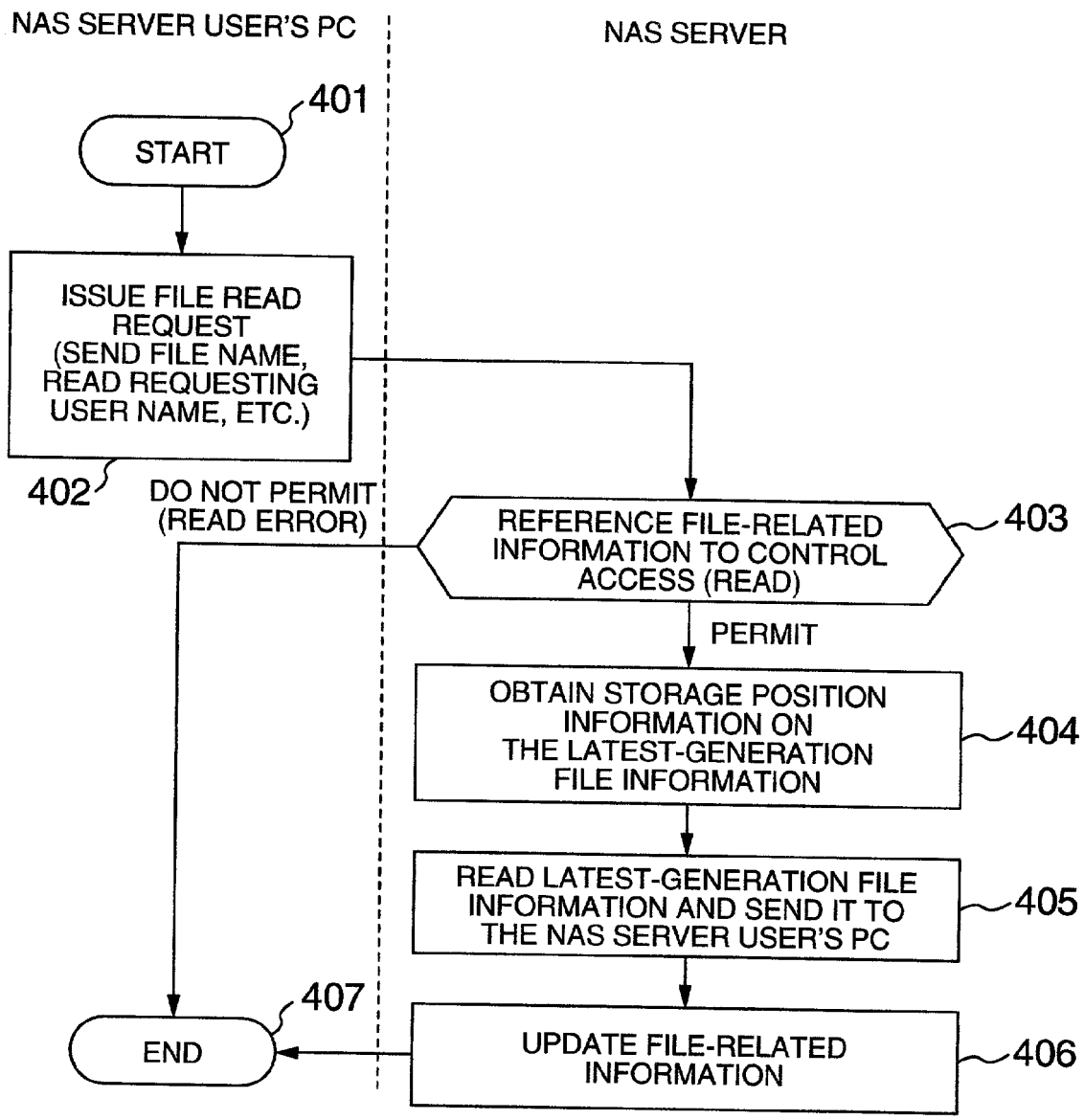
FIG. 8 is a sequence diagram showing an example of file read processing operation of the file storage system in FIG. 1.

Next, referring to FIG. 8, the file read processing operation performed by the user's PC 102 and the NAS server 103 in this embodiment will be described.

First, in step 401, the NAS user's PC 102 starts file read processing and, in step 402, the NAS user's PC 102 issues a file read request to the NAS server 103. In this step, information necessary for controlling file access, such as the file name and the read requesting user name, is sent.

Then, control is passed to the NAS server 103. First, in step 403, the NAS server 103 references the "access permission information" included in the file-related information corresponding to the file name to check if the access (read) is permitted. If the access is not permitted, the NAS server 103 returns "read error" to the NAS user's PC 102 and ends processing; if the access is permitted, control is passed to step 404.

In step 404, the NAS server 103 references the file generation management information to obtain the position information on the file information corresponding the generation stored in the latest generation number column. In step 405, the NAS server 103 reads the file information stored in the position obtained in the previous step 404 and sends the file information to the user's PC 102.

In addition, in step 406, the NAS server 103 updates the file-related information as necessary. For example, if the file-related information includes "last file read time", the NAS server 103 updates the "last file read time".

After that, control is passed to step 407 and the NAS user's PC 102 ends processing.

Figure 9:
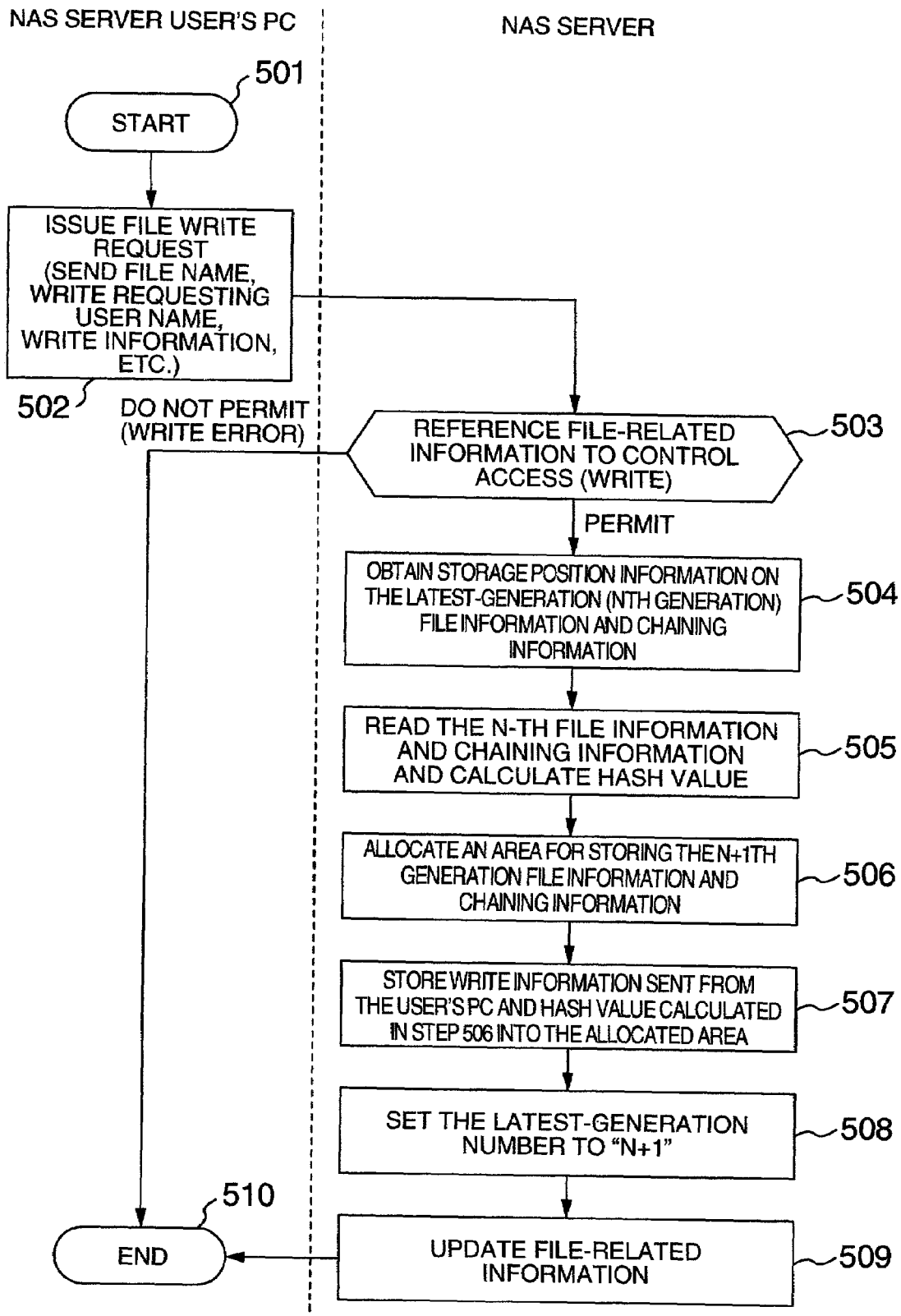
FIG. 9 is a sequence diagram showing an example of file write processing operation of the file storage system in FIG. 1.

Next, referring to FIG. 9, the file write processing operation performed by the user's PC 102 and the NAS server 103 in this embodiment will be described.

First, in step 501, the NAS user's PC 102 starts file write processing and, in step 502, the NAS user's PC 102 issues a file write request to the NAS server 103. In this step, the PC 102 sends information necessary for controlling file access, such as the file name and the write requesting user name, and write data to the server 103.

Then, control is passed to the NAS server 103. First, in step 503, the NAS server 103 references the file-related information corresponding to the file name to check if the access (write) is permitted. If the access is not permitted, the NAS server 103 returns "write error" to the NAS user's PC 102 and ends processing.

If the access is permitted, the NAS server 103 references the file generation management information in step 504 to obtain the position information on the file information and chaining information corresponding to the generation (nth generation) stored in the latest generation number column. In step 505, the NAS server 103 reads the nth generation file information and chaining information, combines them, and calculates the hash value.

In addition, in step 506, the NAS server 103 allocates an area for storing the new file information and chaining information and stores the allocation information, such as information on the storage positions where information is to be stored, in the generation number "n+1" column in the file generation management information.

After that, in step 507, the NAS server 103 writes the write data received from the NAS user's PC 102 and the hash value calculated in step 505 in the areas allocated in the previous step 506. In step 508, the NAS server 103 sets the value of the latest generation number column to "n+1".

In addition, in step 509, the NAS server 103 updates the file-related information as necessary. For example, if the file-related information includes "last file read time", the NAS server 103 updates the "last file read time".

Then, control is passed to step 510, and the NAS user's PC 102 ends processing.

Figure 10:
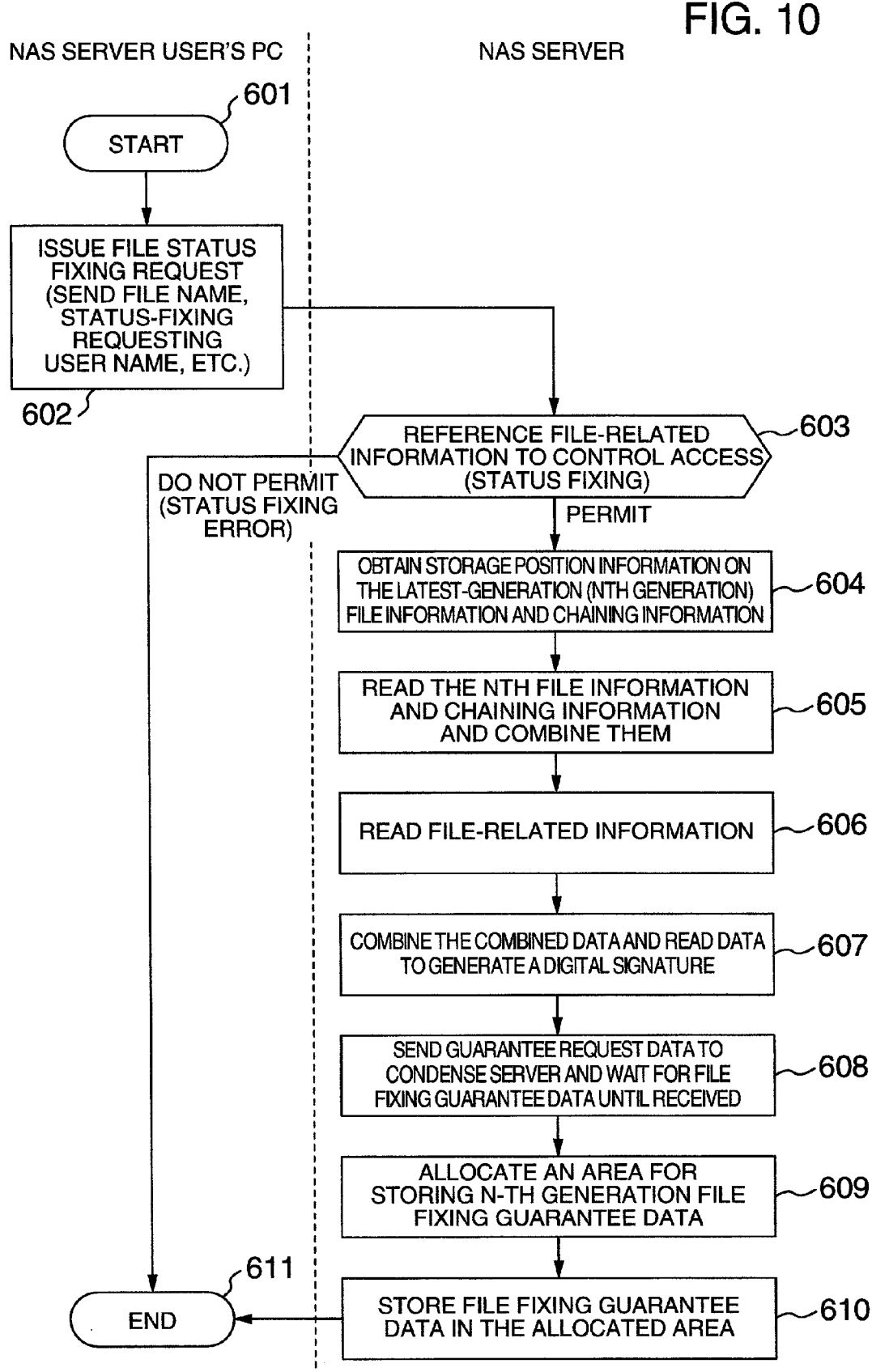
FIG. 10 is a sequence diagram showing an example of the first operation of file status fixing processing of the file storage system in FIG. 1.

Next, referring to FIG. 10, the processing operation performed by the user's PC 102 and the NAS server 103 during file status fixing processing, which is performed by the user's PC 102, NAS server 103, condense server 104, and publication server 105, will be described.

First, in step 601, the NAS user's PC 102 starts file status fixing processing and, in step 602, the NAS user's PC 102 issues a file status fixing request to the NAS server 103. In this step, the NAS user's PC 102 sends information necessary for controlling file access, such as the name of the file to be fixed and status-fixing requesting user name.

Then, control is passed to the NAS server 103. First, in step 603, the NAS server 103 references the file-related information corresponding to the file name to check if the access (status fixing) is permitted. If status fixing is not permitted, the NAS server 103 returns "status-fixing error" to the NAS user's PC 102 and ends processing.

If the access is permitted, the NAS server 103 references the file generation management information in step 604 to obtain the position information on the file information and chaining information corresponding to the generation (nth generation) stored in the latest generation number column. In step 605, the NAS server 103 reads the nth generation file information and chaining information and combines them.

When file-related information is taken as a guarantee objective, in step 606, the NAS server 103 reads the file-related information on the file and, in step 607, combines the combined data obtained in step 605 with the data read out in step 606, and generates a digital signature for the combined hash values using the signing private key of the NAS server 103. The data composed of the combination of two data and the generated digital signature is the guarantee request data 1014 shown in FIG. 3. However, FIG. 3 shows when the step 606 does not use the file-related information. Alternatively, in the step 607, before combining the two data, hash values of the respective data may be calculated and combined. The digital signature may be generated for the combined hash values.

After that, in step 608, the NAS server 103 sends the guarantee request data 1014 to the condense server 104 and waits for the condense server 104 to send the file fixing guarantee data 1050 as the response.

In response to the file fixing guarantee data 1050 from the condense server 104, the server 103 allocates, in step 609, an area in the storage device 204 for storing the file fixing guarantee data 1050, and stores the allocation information, that is, the storage position information on the allocated area, in the nth generation number column in the file generation management information.

Then, in step 610, the NAS server 103 writes the file fixing guarantee data 1050, which was sent from the condense server 104, in the area allocated in the previous step 609 and ends processing in step 611.

Next, referring to FIG. 11, the processing operation performed by the condense server 104 during file status fixing processing, which is performed by the user's PC 102, NAS server 103, condense server 104, and publication server 105, will be described.

First, in step 701, the condense server 104 starts "file status fixing processing" and, in step 702, checks if the publication time (for example, once a week) has arrived. If the publication time has arrived, control is passed to step 708 and the following steps; otherwise, control is passed to step 703 and the following steps to perform "hysteresis signature" processing.

In step 703, the condense server 104 checks if guarantee request data has been received from the NAS server 103. If the data has been received, control is passed to step 704; otherwise, control is passed back to step 702.

In step 704, the condense server 104 obtains the latest pre-stored signature record, in this example, Mth signature record and calculates its hash value to generate new backward chaining data. In step 705, the condense server 104 combines the backward chaining data with the guarantee request data to generate to-be-signed data.

After that, in step 706, the condense server 104 adds a signature to the to-be-signed data using the signing private key of the condense server 104 and, in step 707, saves the backward chaining data, the guarantee request data, and the signature as the (M+1) th signature record, and then passes control back to step 702.

If it is found, during publication time (for example, once a week) checking in step 702, that the publication time has arrived, the condense server 104 obtains the latest (M_Xth) signature record at that time in step 708 and calculates the hash value to generate new backward chaining data.

In step 709, the condense server 104 creates publication data (for example: data including the publication time, publication server name, condense server name, etc.) and combines the created publication data with the backward chaining data to generate to-be-signed data. In step 710, the condense server 104 adds a signature to the signature-to-be-added data using the signing private key of the condense server 104.

After that, in step 711, the condense server 104 combines the backward chaining data, publication data, and signature into "validity-guaranteed data 1051" and sends it to the publication server 105.

In addition, in step 712, the condense server 104 sends, as the file fixing guarantee data 1050, a combination of the ith to M_Xth signature records and the validity-guaranteed data 1051 back to the NAS server corresponding to the ith ($1 \leq i \leq M\_X$) signature record, for example, the NAS server 103 that has sent the guarantee request data 1014 included in the ith signature record.

In step 713, the condense server 104 sets the latest signature record number to 0 and randomly generates the initial value of the 0th signature record, saves the generated initial value, and then passes control back to step 702.

Next, referring to FIG. 12, the processing operation performed by the user's PC 102 during file status fixing verification processing in this embodiment, will be described. Although the user's PC 102 performs verification processing in this embodiment, others may perform this processing.

For example, an arbitration organization may perform file status fixing verification processing by receiving data, which is necessary for file status verification, from the NAS server 103 as the evident in order to check if what the user of the NAS server 103 is saying is valid. Even in this case, the procedure shown in FIG. 12 may be used.

First, in step 801, the user's PC 102 starts "file status fixing verification processing" and, in step 802, obtains a fixed file, more specifically, a fixed file including the file information, chaining information, and file-related information of the generation, as well as the corresponding file fixing guarantee data 1050, from the NAS server 103.

Next, in step 803, the NAS user's PC 102 confirms that the guarantee request data 1014 included in the file fixing guarantee data 1050 may be verified by the signature verification processing using the public key of the NAS server 103. More specifically, known digital signature verification processing may be used. If the confirmation ends unsuccessfully, control is passed to step 809 and a "verification error" results.

If the verification ends successfully, the user's PC 102 confirms in step 804 that the guarantee request data 1014 includes the hash values calculated in steps 605 and 606. If the confirmation ends unsuccessfully, control is passed to step 809 and a "verification error" results.

If the confirmation ends successfully, the user's PC 102 confirms in step 805 that the validity-guaranteed data 1051 included in the file fixing guarantee data 1050 is actually publicized by the publication server 105, for example, on newspapers. If the confirmation ends unsuccessfully, control is passed to step 809 and a "verification error" result.

If the publication is confirmed successfully, the user's PC 102 uses the publication key of the condense server 104 to verify, in step 806, the signature records included in the file fixing guarantee data 1050, that is, the records each composed of a pair of to-be-signed data and a signature where the to-be-signed data is composed of backward chaining data and guarantee request data. If the verification ends unsuccessfully, control is passed to step 809 and a "verification error" results.

If the verification ends successfully, the user's PC 102 confirms, in step 807, the chain relation among the signature records included in the file fixing guarantee data 1050. That is, the user's PC 102 confirms if the backward chaining data (included in the to-be-signed data) included in each signature record matches the hash value of the immediately preceding signature record (this record includes to-be-signed data and the signature). If the confirmation ends unsuccessfully, control is passed to step 809 and a "verification error" results. If the confirmation ends successfully, control is passed to step 808, the message "verification succeeded" is output and processing ends.

As described above with reference to FIGS. 1–12, when the user of the NAS server 103 wants to fix the status of a file, he or she uses the NAS user's PC 102 to issue a fixing request to the NAS server 103 connected via the Internet 101. This request generates evidence information, called fixing guarantee data 1050 in this embodiment, which will prove, for a long time, the contents of the file and its related information at the time of the request, including the creator, creation date and time, updater, update date and time, attribute, and access information. The generated information, which is saved with the file in the NAS server 103, allows the file status to be fixed safely and for a long time. Unlike the conventional technology that requires physical media such as a CD-R, the system according to the present invention does not require any special device.

Another advantage of this embodiment is that the operator of the NAS server 103 may provide the user with the file fixing service. In response to a request from a user, the NAS server 103 fixes the status of a file at the time of the request. That is, the NAS server 103 generates file fixing guarantee data of the file and manages the generated data with the file.

The fact that this file fixing guarantee data has not been altered is found by checking that a part of the file fixing guarantee data matches data publicized by the publication server 105 and that the coherence of the file fixing guarantee data is maintained, that is, the configuration of file fixing guarantee data satisfies a predetermined condition. Therefore, even if a long time has elapsed since a fixing request was issued, what status the file was in at that time may be proved.

The ability to prove the file status is still maintained even if the signing private key, which should be kept secret by the NAS server 103, has leaked. This is because the ability to prove the file status is based not only on the digital signature generated by the NAS server 103.

In addition, a user file, including its change history, is managed in this embodiment while forming a chain structure from the time the file is created to the time the last change is made so that file alteration becomes extremely difficult. Therefore, checking the chain relation can prove not only the file status at the time a fixing request was issued but also the file alteration history to the time the file is fixed.

Furthermore, the ability of the condense server 104 in this embodiment to receive guarantee request data from a plurality of NAS servers 103 eliminates the need for publication on a NAS server basis, ensuring increased efficiency.

Another advantage of the condense server 104 is that signatures are generated for guarantee request data sent from the NAS servers using the history-information-based digital signing method, that is, "hysteresis signatures", disclosed in the above-mentioned U.S. Ser. Nos. 09/697,666 and 09/693,713 (JP-A-2001-331104 and JP-A-2001-331105). This offers immunity from the leakage of the signing private key of the condense server 104. For example, the validity of the signature may be proved. It is also possible to indicate the chronological sequence relation among multiple units of guarantee request data.

Also, in this embodiment, after a part of signature history composed of hysteresis signatures is sent to the publication server 105 as validity-guaranteed data, a sequence of chains, from the guarantee request data 1014 sent from the NAS server 103 to the validity-guaranteed data 1051 sent to the publication server 105, is sent back to the NAS server as the file fixing guarantee data 1050. This allows the status of the file to be proved without having to send an inquiry to the condense server 104.

As described above, a safe storage system is provided in this embodiment that makes the files stored in the NAS server 103 provable at the time a request is issued and that makes it possible to generate evidence information that will be effective in future.

The present invention is not limited to the embodiment described in FIGS. 1–12 but may be changed in various ways without departing from the spirit. For example, although the chain structure is built for each file in this embodiment, that is, data for forming a chain among files is generated based on the immediately-preceding status of the file, the latest status of some other file of the same user or the latest status of a file of some other user at that time may be reflected. This configuration makes clear the chronological relation among a plurality of files. This configuration also requires an unauthorized user to consider consistency with other files, further increasing safety.

Instead of providing the condense server 104, the NAS server 103 may send the latest save file data, more specifically, the guarantee request data 1014, directly to the publication server 105 to ask it to publicize the data.

As in the condense server 104, chained data may be managed in the NAS server 103 based on the hysteresis history. In this case, it is desirable that the NAS server be a reliable public authority.

Although the network is the Internet 101 in this embodiment, a LAN or a WAN (Wide Area Network) may also be used.

Although an optical disc is used as the recording medium in the computer configuration of the servers in this embodiment, an FD (Flexible Disk) may also be used as the recording medium. In addition, when installing a program, the program may be downloaded from the network via a communication unit and then installed.

Program aspects of the technology may be thought of as a "product," typically in the form of an executable that is carried on or embodied in a type of machine readable medium. Media include any or all of the memory and storage devices of the computers or the like, examples of which have been discussed above. As noted, the program also may be downloaded via a network communication. Hence, terms such as "computer readable medium" (or media) as used herein are intended to encompass any physical medium or transmission medium that participates in providing the computer executable program to a computer for execution or other processing.

According to the present invention, file fixing guarantee data including data publicized by the publication server is generated in response to a file status fixing request from the user and the generated data, associated with the file, is stored in a storage server such as a NAS server on the network. Therefore, the present invention provides a storage system which proves, safely and for a long term, the status of the file at the time of a fixing request from the user and reduces the burden on the user.

It should be further understood by those skilled in the art that the foregoing description has been made on embodiments of the invention and that various changes and modifications may be made in the invention without departing from the spirit of the invention and the scope of the appended claims.

What is claimed is:

1. A file storage system comprising at least one user computer, a storage server connected to said user computer over a network for storing files, and a condense server connected to at least said storage server via the network for generating file fixing guarantee data,
   (A) said storage server comprising:
      means for accepting a request for fixing a file status from said at least one user computer;
      means for generating a request for guaranteeing file fixing in response to said file status fixing request, said file fixing guarantee request being to request file fixing guarantee data for proving a status of the file managed by said storage server at the time of the fixing request to a third party;
      means for sending said file status fixing guarantee request to said condense server;
      means for accepting file status fixing guarantee data generated by said condense server in response to said file status fixing guarantee request, said file status fixing guarantee data guaranteeing the status of a fixed file; and
      means for storing said accepted file status fixing guarantee data so as to associate with said file;
   (B) said condense server comprising:
      means for receiving said file status fixing guarantee request, from said storage server;
      means for generating said file status fixing guarantee data based on said file status fixing guarantee request; and
      means for sending said generated file status fixing guarantee data to said storage server.

2. The file storage system according to claim 1,
   further comprising a publication server which publicizes digital data as validity-guaranteed data,
   wherein said file status fixing guarantee data includes the validity-guaranteed data publicized by said publication server.

3. The file storage system of claim 1, wherein said storage server comprises:
- first means for generating and storing each of the files with alteration preventing information attached, the alteration preventing information being generated based on the file stored previously to form a chain of generations of the file; and
- a second means for publicizing a latest generation of the file at a specified time.

4. The file storage system according to claim 3, wherein said first means adds a hysteresis signature to the file stored previously to generate the alteration preventing information.

5. The file storage system according to claim 3, further comprising a publication server connected to said storage server over the network wherein said publication server, in response to the publication by the storage server, receives the latest file from the storage server for publication.

6. The file storage system according to claim 1, wherein said storage server sends the file fixing guarantee data, which is sent from said condense server, to said user computer, which includes means for storing the data, to verify the file on the user computer based on the file fixing guarantee data.

7. A network attached storage (NAS) server connected to the at least one user computer over a network for storing files, wherein said NAS server is configured as the storage server in the file storage system according to claim 1.

8. A file storage method in a storage server connected to at least one client computer and to a condense server over a network and including a storage, said method comprising:
- accepting a request for fixing a file status from said at least one client computer:
- in response to the file status fixing request from said client computer, generating a request for guaranteeing file fixing, the file fixing guarantee request being to request file fixing guarantee data for proving to a third party a status of the file at the file fixing request time;
- sending the file fixing guarantee request to the condense server for generation of file status fixing guarantee data based on the file status fixing guarantee request;
- receiving the generated file status fixing guarantee data from the condense server at the storage server; and
- storing the generated file fixing guarantee data in said storage of the storage server, said file fixing guarantee data being correlated with the file.

9. A product comprising a computer readable medium and a computer-executable program embodied in said medium for implementing using a computer, a file storage method in a storage server connected to at least one client computer and to a condense server over a network and including a storage, said method comprising the steps, by said storage server, of:
- in response to a file status fixing request received from said client computer, generating a request for guaranteeing file fixing, the file fixing guarantee request being to request file fixing guarantee data for proving to a third party a status of the file at the time of the file fixing request;
- sending the file fixing guarantee request to the condense server for generation of file status fixing guarantee data based on the file status fixing guarantee request;
- receiving the generated file fixing guarantee data from the condense server; and
- storing the generated file fixing guarantee data in said storage of the storage server, said file fixing guarantee data being correlated with the file.

10. The file storage system according to claim 1, wherein said file status fixing guarantee data for said file to which a status fixing request is made includes a digital signature of said condense server which said condense server generates in response to said file status fixing guarantee request for said file.

* * * * *